Inventor:
Edward A. Rockwell

Oct. 10, 1933.  E. A. ROCKWELL  1,929,517
POWER BRAKE CONSTRUCTION
Filed June 24, 1929  7 Sheets-Sheet 6

Inventor
Edward A. Rockwell
By Wilkinson Huxley Byron Knight
Attys

Patented Oct. 10, 1933

1,929,517

UNITED STATES PATENT OFFICE 1,929,517

POWER BRAKE CONSTRUCTION

Edward A. Rockwell, Chicago, Ill.

Application June 24, 1929. Serial No. 373,333

14 Claims. (Cl. 188—140)

The present invention relates to improvements in power brake construction especially applicable to motor vehicles of standard four wheel brake design.

In the design of control linkage of the wheel brakes of a vehicle whereby the operator directly applies the wheel brakes through the movement of the pedal lever, the difficulties of obtaining sufficient brake pressure by mechanical leverage alone have been well recognized. It would be desirable to have a system so constructed that the operator, by a relatively short pedal movement and a light foot pressure, could quickly and smoothly control the application of a sufficiently high braking pressure to the wheel brakes.

It has been proposed to utilize the momentum of the vehicle, which is otherwise thrown away, to assist in the braking. Self-energizing wheel brakes, in which the bands or shoes are pressed more tightly into engagement through the rotation of the brake drum, and servo brakes in which a floating servo shoe is forced by the rotation of the brake drum to apply a secondary shoe, have been developed. Another method of utilizing momentum consists in the provision of a primary brake which upon actuation under the control of the operator will react and apply the secondary wheel brakes. Such a primary brake may be associated with any positively driven part of the vehicle and may be called a power brake. In the ordinary slipping clutch type, one clutch member that is normally stationary is axially moved to engage a driving clutch member which is positively rotated. The first clutch member is caused to turn due to the frictional engagement, and suitable connections are provided to transmit this movement to the wheel brake linkage. The action of the slipping clutch is objectionable, since the operator is unable to closely control the output pressure from the clutch to the wheel brakes. This is especially true in braking at high speeds. In another type, which is a modification of the slipping clutch, an ordinary brake drum forms the driving clutch member, and brake elements are provided mounted on movable fulcrums or anchor points. The application of the brake elements develops a reaction resulting in a movement of the fulcrums, and this movement is transmitted to the wheel brake linkage. The same objections apply to this construction, since the braking action is uneven and difficult to control.

In another type of power brake unit a primary brake is provided associated with a positively driven part of the vehicle and is under the selective control of the operator. The operation of this power unit serves to take up the slack and clearances in the wheel brake linkage and apply the shoes or bands to the wheel brake drums, but the momentum of the vehicle does not serve to develop a high braking force independently of the operator. An example of this type is the ordinary differential brake, wherein the carrier for a satellite gear or pinion is directly driven. The satellite gear or pinion engages a pair of planet gears or pinions, one of which planet gears is connected through to the wheel brake applying linkage. The other of the planet gears or pinions is connected to a normally rotatable but retardable brake drum. The application of pressure to the retardable brake drum will serve to hold it stationary, while the other planet gear is turned by the rotation of the carrier to apply the wheel brakes. But as soon as the reaction on the wheel brakes overcomes the resistance applied to the differential brake drum, slipping will occur, and it is therefore apparent that the wheel braking force will be directly proportional to the pressure applied to the differential brake drum. There are, however, objections to the differential type of power brake. The construction is complicated and usually requires association with a countershaft that is geared down from the main power drive. Furthermore, sufficient mechanical leverage cannot readily be attained in a differential type. I have disclosed in my copending application Serial No. 224,846, filed October 8, 1927, an improved power brake in which the normally rotatable retardable brake drum is mounted on the power shaft of a vehicle. The retardation of the brake drum causes the power shaft to displace a coaxially associated brake operating sleeve. This movement is transmitted to the wheel brake linkage. The laterally movable brake operating sleeve is positively driven by the power shaft and is connected to the retardable brake drum through suitably constructed cam surfaces, which tend to amplify the resistance developed to the rotation of the brake drum, and may be, as shown in my above mentioned application, spiral threads. It will be apparent that the amount of leverage developed will be dependent not only upon the pitch of the threads, but also upon the relative diameters between the brake drum and the spiral threads. The construction is such that the laterally movable sleeve will be displaced in the same direction regardless of the direction of rotation of the brake drum.

The amount of braking force is therefore directly proportional to the pressure applied by the operator, and the momentum of the vehicle merely assists in taking up the slack and clearances in the wheel brake linkage.

It is obvious that if a self-energizing brake is used to apply the retarding force to the wheel brake drum, it will be difficult for the operator to carefully control the output pressure.

It is the purpose of the present invention to provide an improved power brake unit in which the primary braking is non-energizing. My preferred embodiment consists in a construction which is non-energizing in either direction of rotation of the power shaft.

It is further a purpose of the present invention to provide a construction of power brake unit in which the primary braking is non-energizing during the forward movement of the vehicle, but may be self-energizing during the rearward movement of the vehicle. The self-energizing action which will necessarily take place at low speeds of the vehicle is taken care of by providing a lower amount of amplification of the output braking force from the power brake unit during the rearward movement of the vehicle. In this construction the operator may closely control the output pressure developed during the forward movement of the vehicle without danger of the wheel brakes becoming locked by an amplification of the braking effort due to the rotation of the power shaft, and, during the rearward movement of the vehicle, the amplified braking force due to the action of the energizing primary braking is taken care of by providing a lower degree of mechanical leverage amplification.

It is a further object of the present invention to provide improvements in the construction of the power brake casing and in the assembly of the yoke and dashpot operating members.

Additional objects and advantages of the present improvements will be more readily apparent from a complete description taken in connection with the attached drawings, in which—

First having reference to Figures 1 to 7, inclusive, there is shown a power brake unit which corresponds in many of its main features to that disclosed in my copending application Serial No. 224,846, previously mentioned.

Figure 1:
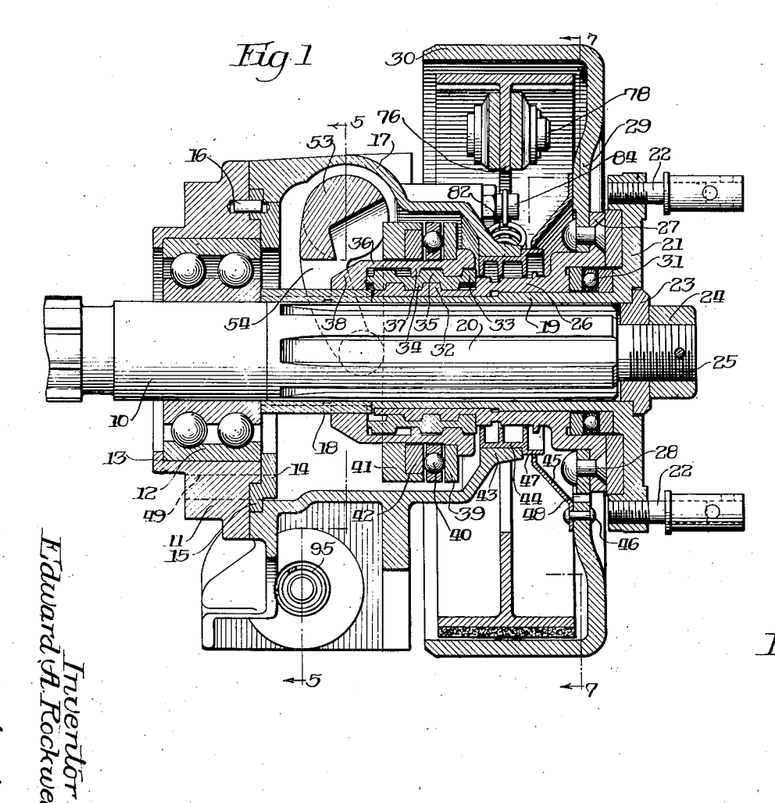
Figure 1 is a longitudinal section through a power brake mounted on a propeller shaft.

Thus, 10 is a power shaft extending from the transmission casing, upon which are mounted operating parts of the power brake unit. A portion of the transmission casing is indicated at 11, which has an opening receiving the power shaft and serving as a mounting for a roller bearing 12. The casing 11 may include a flange 13 against which the forward end of the bearing 12 abuts. The rearward end of the bearing 12 is held in place by the ring member 14, which includes a stepped flange 15. Pins 16 extend into openings formed in the ring member 14 and transmission casing 11 and prevent rotative movement of the ring member. The retainer ring 14 is held in place against the casing 11 by the brake casing 17, which abuts against the stepped flange 15 of the retainer ring 14.

Mounted upon and keyed to the power shaft 10 is a spacing sleeve 18, which is in abutting relation with the rearward end of the bearing 12. In abutting relation with the spacing sleeve 18 is a sleeve 19, which is also keyed to the power shaft through the splines 20. The sleeve 19 is formed integral with the flange 21 and is provided with suitable stud connections 22 extending to a universal joint connection. The sleeve 19 is pressed into place through the washer 23 and the nut 24, which is threaded to the rearward end 25 of the shaft 10.

Figure 4:
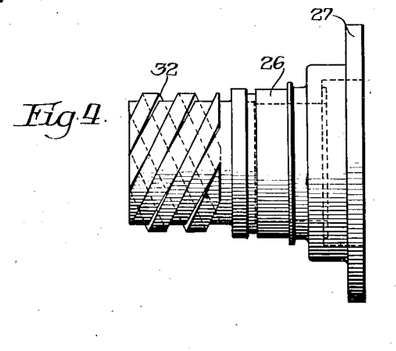
Figure 4 is a detailed elevation of the inner spiral sleeve which is associated with the brake drum.

Mounted upon the sleeve 19 in such a manner as to be free for rotation in respect thereto is the member 26, which is shown in detail in Figure 4. The member 26 includes a flange 27, which is fastened by the rivets 28 to the flange 29 of the brake drum 30. Mounted between the member 26 and the flange 21 is a thrust bearing 31. The member 26 also includes an externally spiraled sleeve portion 32. The spiral portion 32 comprises a left-hand thread of a relatively low pitch. Mounted on the portion 32 is a sleeve 33, which has a corresponding internal spiral thread 34 of low pitch and an external spiral thread 35 of substantially greater pitch.

Figure 2:
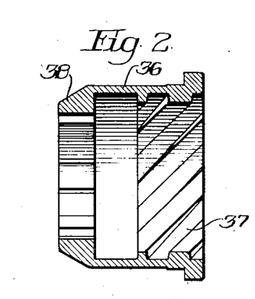
Figure 2 is a detailed section through a brake operating spiral sleeve.
Figure 3:
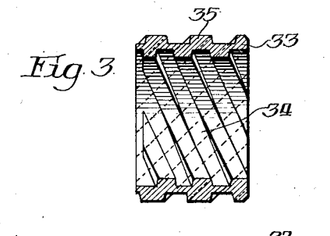
Figure 3 is a detailed section through the intermediate double spiral sleeve.

Cooperating with the intermediate sleeve 33 is an outer brake operating sleeve 36 having an internal thread 37 arranged to cooperate with the external thread 35. The sleeve 36 also includes a flanged portion 38, which is keyed to the spacing sleeve 18 so as to rotate therewith. The threads 35 and 36 are right-hand threads. The action of the spiral elements has been fully described in my copending application Serial No. 224,846, except that in said application the left-hand and right-hand threads were of corresponding pitch.

Figure 5:
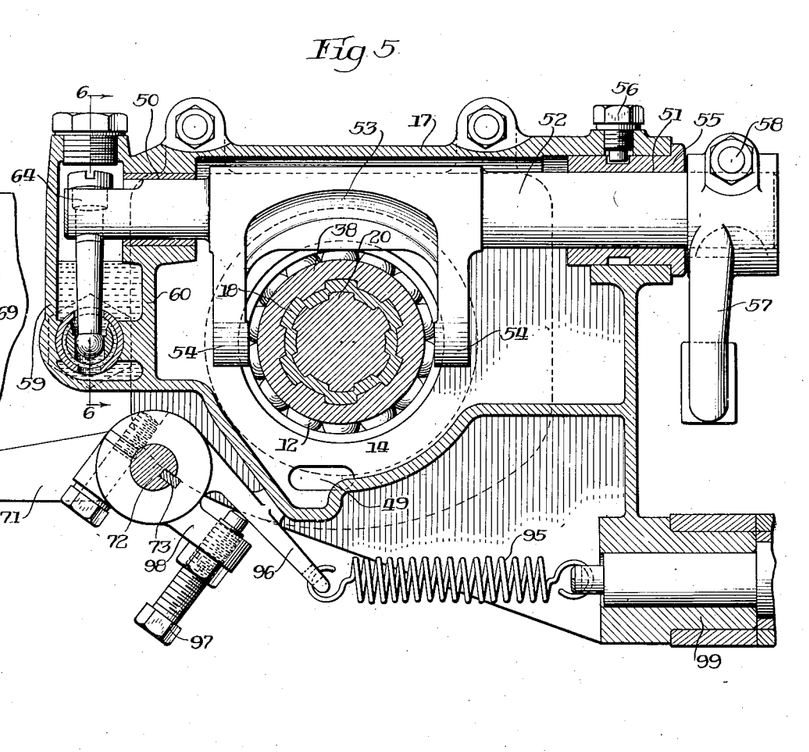
Figure 5 is a transverse section taken through the power brake unit shown in Figure 1 and illustrating the mounting of the yoke operating member.
Figure 6:
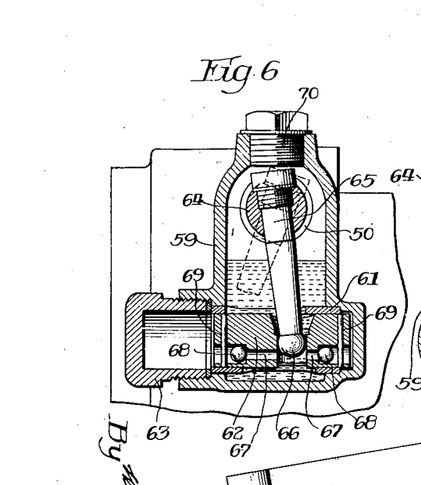
Figure 6 is a detailed vertical section taken through the dashpot unit on a plane indicated by 6—6 in Figure 5.

Upon the brake operating sleeve 36 is mounted a thrust ring 39, a roller bearing thrust element 40 and a yoke engaging ring 41, which holds a separable thrust member 42, which is in direct engagement with the ball bearings of the thrust element 40. The brake casing 17 encloses the brake operating sleeve members and extends to a circular ring portion 43 surrounding the member 26. Mounted in the portion 23 is a metal stamping 44, which acts as an oil seal or deflector and directs the oil which may leak therethrough toward a conical oil deflector 45, which is secured to the flange 29 of the brake drum by the rivets 46. Thus, the stamping member 44 includes a flange 47 which overhangs the edge of the deflector 45. Suitable openings are formed in the flange 29 of the brake drum, as at 48, to permit the oil which is caught by the deflector ring 45 to leak outside of the brake drum. In Figure 5, which shows a transverse section of the brake casing 17, appears an opening 49, which allows the oil collected in the casing 17 to leak back into the transmission casing. The casing 17 includes the bearings 51—51 to mount a transverse rock shaft 52, having a central yoke portion 53 including depending yoke arms 54—54. The bearing 51 is provided with a bushing 55, which is held in the bearing opening of the casing 17 by the bolt 56.

Upon the outwardly extending end of the rock shaft 52 is a lever arm 57 fastened by the tightening bolt 58. The left-hand portion of the casing 17 is formed to provide a dashpot housing 59, which is shown in section in Figure 6. Between the dashpot housing 59 and the major portion of the chamber formed by the casing 17 is a dividing wall 60. Within the dashpot housing 59 is mounted a dashpot cylinder 61 adapted to guide the dashpot plunger 62. Threaded into an end of the dashpot chamber is a nut 63, which permits assembly of the dashpot cylinder and plunger. The left-hand end of the rock shaft 52 includes a reduced portion 64 into which is threaded the arm 65, which has a ball end 66 adapted to engage an opening formed in the dashpot plunger. Through the dashpot plunger 66 are formed oil passages 67 controlled by ball valves 68, which are held against dislodgement by the pins 69. At the top of the dashpot housing 59 is a filling plug 70.

The operation of the spiral sleeves has been previously described in my copending application Serial No. 224,846. It will be apparent that the retardation of the brake drum, by means to be hereinafter described, will cause the outer sleeve 36 to be relatively displaced in an axial direction, thus transmitting a thrust to the arms 54 of the yoke member. The movement of the yoke will turn the rock shaft 52. This movement will be resisted in part by the action of the dashpot plunger. The use of a dashpot in connection with a power brake unit has been described in my copending application Serial No. 365,071, filed May 22, 1929. However, in the present construction, by separating the dashpot housing from the main brake housing, it is possible to use a special oil in the dashpot chamber. The ball valves 68 mounted in the dashpot plunger act as snifter valves. Thus, in the movement of the dashpot plunger to the left in Figure 6, the ball valve on the left-hand side will be held closed by the resistance of the oil, while the valve on the opposite side will be opened to suck in the oil. The plunger is adapted to loosely fit the guiding cylinder and permit some leakage of oil around the sides.

The dashpot makes the operation of the lever arm 57 more even and uniform, and will also tend to hold the yoke member in "on" position. Thus, although the operator may quickly release the brake pedal, the dashpot will only allow a slow return of the brake linkage, and therefore successive operations of the brake pedal may be had without necessitating the taking up of all of the slack in the brake linkage.

Figure 7:
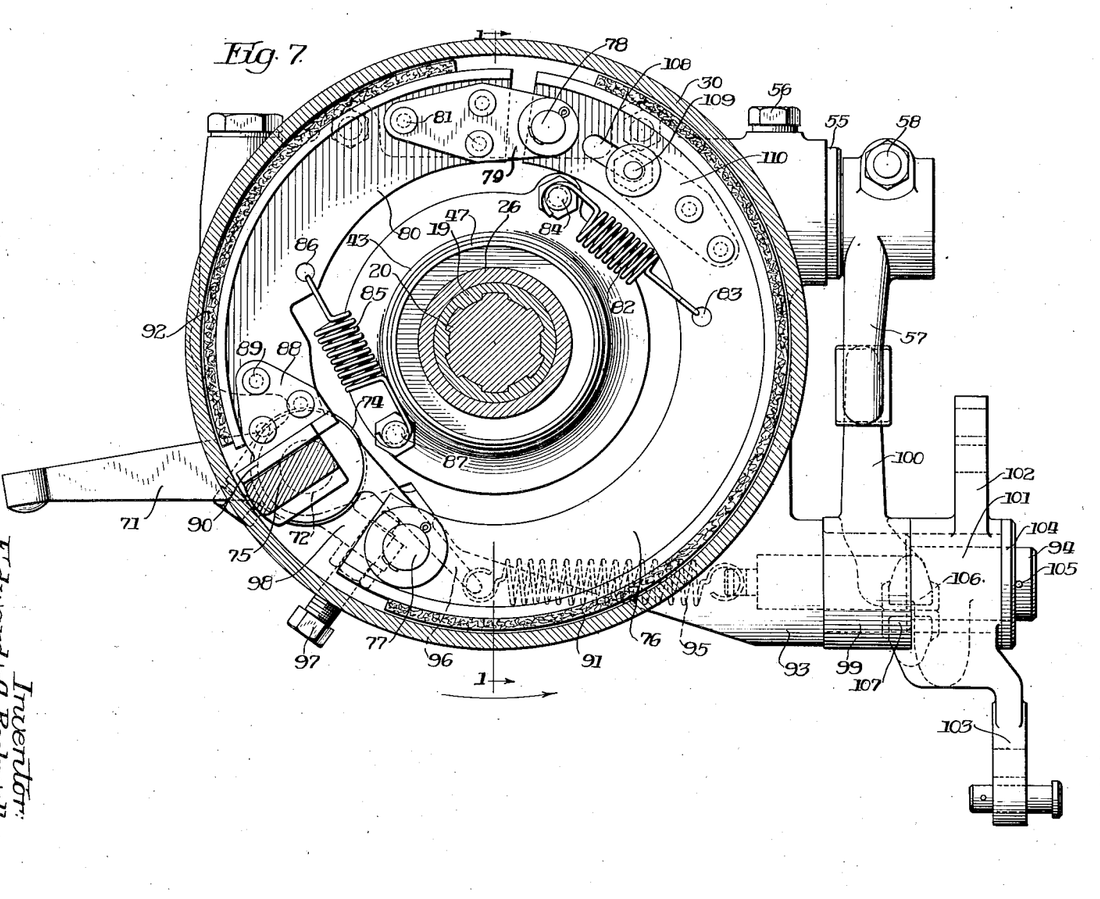
Figure 7 is a vertical section taken transverse to the power shaft through the brake power unit illustrated in Figure 1 and showing the mounting of the brake shoes.
Figures 8, 9:
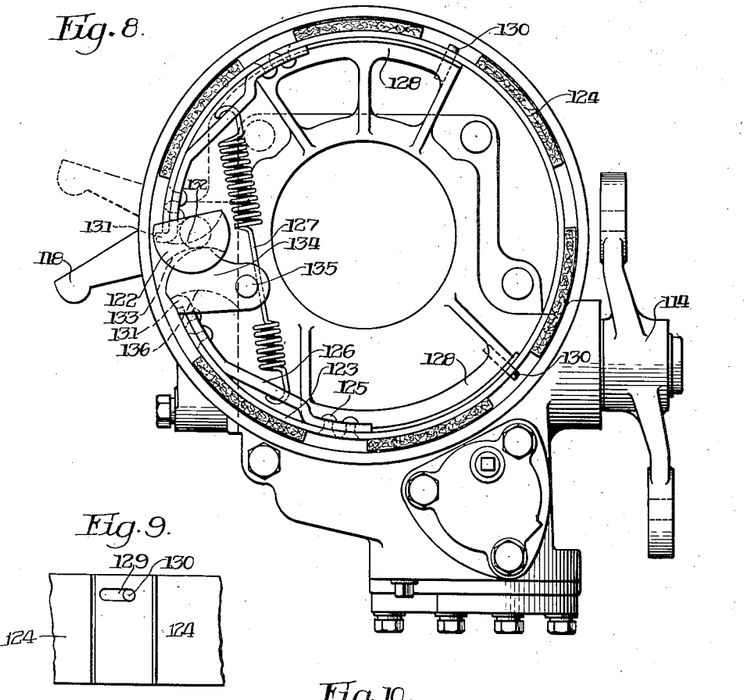
Figure 8 is a fragmentary end elevation illustrating a modified arrangement of brake elements and showing an expanding band type.
Figure 9 is a detail of the centralizer pin.
Figure 10:
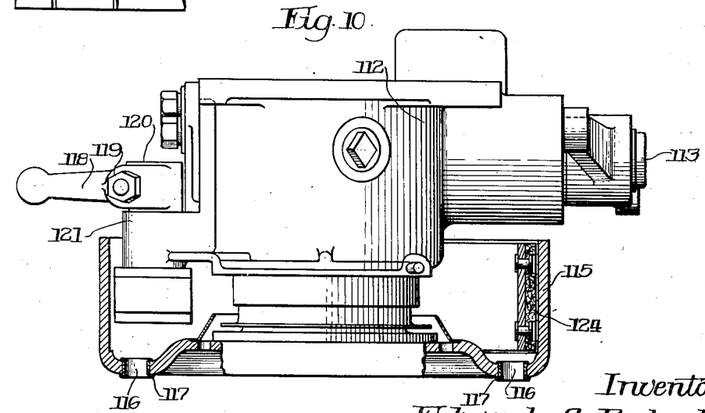
Figure 10 is a plan elevation, partially in section, of the power brake unit illustrated in Figure 8.

Means for applying a braking force to the power brake drum 30 is illustrated in Figure 7. Thus, a lever arm 71 is fixedly secured to a pivot shaft 72 by the key 73. The pivot shaft 72 is mounted in a boss 74 extending from the fixed casing 17. On the inner end of the pivot shaft 72 is secured a cam lug 75 adapted upon turning movement to apply the brake shoes. In the construction shown, there are a pair of internally expanding shoes, one shoe 76 being anchored by the pivot pin 77. Adjacent to the unanchored end of the shoe 76 is a slotted opening 108 which receives a centralizer bolt 109. Secured to the web of the shoe may be the bracket 110 having an end cooperating with the bolt 109. The bolt, together with springs (not shown), also serves as an anti-rattler in the usual manner. The unanchored end of the shoe 76 carries a pivot 78, to which is attached, by the bracket 79, the end of a second shoe 80. The bracket 79 is riveted to the web of the shoe 80 by the rivets 81. A diagonal coil spring 82 extends from an opening 83 in the web of the shoe 76 to a fixed connection 84. A similar spring 85 is connected to the opening 86 of the shoe 80 and extends to the fixed connection 87. The springs 82 and 85 tend to hold the brake shoes in released position.

To the end of the shoe 80 opposite the bracket 79 is attached a bracket 88 fastened by the rivets 89. The bracket 88 includes an upturned end 90 normally pressed into engagement with a plane face of the lug 75. The rotation of the brake drum during a forward movement of the vehicle is indicated by the arrow in Figure 7. Upon movement of the lever arm 71 in a clockwise direction to apply the brake shoes, the cam lug 75 will transmit a thrust to the brake shoe 80. The initial movement of the brake shoe 80 will be so resisted by the tension of the spring 85 that the shoe will not be initially applied, but will tend to impart a circumferential thrust to the unanchored end of the shoe 76. The shoe 76 is provided on its face with friction material 91, while the shoe 80 is provided with the friction material 92. The shoe 76, due to the circumferential thrust imparted by the shoe 80, will tend to swing about its pivot 77 and be forced into engagement with the internal braking surface of the brake drum. Further movement of the lever arm 71 will force the shoe 80 into engagement with the brake drum. It is obvious that the direction of rotation during the forward movement of the vehicle tends to unwrap the brake shoes, that is— the rotation tends to force the brake shoes to released position. Thus the entire reaction of the torque developed by the rotation of the brake drum upon the shoes will be applied to the cam lug 75. By this arrangement the operator is always conscious, by the resistance of the brake pedal, of the pressure developed in the power brake.

It is difficult to properly control power brakes of the self-energizing type; that is, if such a brake is operated at a high speed of movement of the vehicle, there will be a tendency for the power brake to be thrown on with such force that the wheel brakes will be locked. In the present construction the power brake may be efficiently actuated at high speeds of rotation of the propeller shaft without danger of the wheel brakes becoming locked. Upon reverse movement of the vehicle, however, the construction shown in Figure 7 will act as an energizing brake, and it is for this reason that the cooperating spirals 35 and 37 are constructed with a relatively higher pitch than the spirals 32 and 34. Thus, the leverage developed by the action of the spirals during reverse movement of the vehicle will be nowhere near as great as that developed during a forward movement of the vehicle. It is further apparent that the movement of the vehicle in reverse is usually at rather low speeds, and therefore the objectionable action of an energizing power brake can easily be taken care of by the lower leverage developed.

Figure 7 also illustrates the manner of transmitting the movement of the thrust arm 57 to a brake applying lever member. The brake casing 17 is formed with a boss 93, within which is slidably mounted a pivot pin 94. The pivot pin is held in position by the spring 95, which is connected to a fixed arm 96 extending from the boss 74. Cooperating with the arm 96 is also provided a stop bolt 97, which is threaded into an arm 98 extending from and integral with the lever arm 71. The pivot pin 94 provides a support for a lever 99 having an upwardly extending arm 100 in thrust engagement with the end of the lever arm 57. Adjacent to the lever 99 is mounted, upon a pivot pin 94, a brake lever 101 having an upwardly extending arm 102 and a depending arm 103, to which the forwardly and rearwardly extending brake rods may be attached. Abutting against the boss of the lever 101 is a washer 104 retained by a pin 105 inserted through the pivot pin 94. Movement of the lever 100 is transmitted to the brake lever 101 through an integral lug 106, which cooperates with a lug 107 integral with the brake lever 101. The construction is preferably such that the brake lever may be moved without actuation of the power unit by a suitable emergency lever connection, as disclosed in my previous application Serial No. 365,071.

Instead of providing a brake construction which is unwrapping during the forward movement of the vehicle and wrapping or self-energizing during the rearward movement of the vehicle, which construction requires different relative pitches in the cooperating spiral sleeves, a more preferred construction consists of a brake which is unwrapping in either direction of the vehicle. It has, of course, been previously proposed to use a brake construction which is unwrapping in any direction for a wheel brake, but they are undesirable because of the great amount of force required to develop sufficient braking pressure to stop the vehicle. However, in a power brake, only light pressures need to be applied by the operator, and therefore it is permissible to use a brake which is unwrapping. So far as is known, no power brakes have been constructed in which the braking is done either by band or by expanding shoes which are so constructed that there is an unwrapping tendency in either direction and the entire reaction developed on the braking elements is imparted to the brake applying member.

It will be obvious that many desirable constructions may be developed to carry out the principle of a brake which is unwrapping in either direction, and in Figures 8 to 14, inclusive, I have specifically shown three modified forms. The first form is an internally expanding band type and is shown in connection with a power brake casing 112, which corresponds to the disclosure of my copending application Serial No. 365,071. In this form of power brake the rock shaft 113 is mounted below and transverse to the power shaft and has mounted on its outwardly extending end a brake applying lever 114. The brake drum mounted to normally rotate together with the power shaft, but retardable with respect thereto, is illustrated at 115, and includes ventilating openings 116 protected against leakage of oil therethrough by the ferrules 117. 118 is the lever which is arranged to be controlled by the operator to actuate the power brake, and is attached by the bolt 119 to a pivot shaft 120 mounted in a fixed boss 121 of the casing 112. The shaft 120 extends within the brake drum and has secured thereto or formed integrally therewith a brake applying cam 122. Within the drum 115 is mounted a circumferential band 123. To the outside of the band 123, at spaced points, are secured friction linings 124 arranged to engage the inner surface of the brake drum upon expansion of the band. Adjacent to the free ends of the band 123 are attached, by the rivets 125, the brackets 126. The brackets 126 are offset from the band 123 at their middle portions in order to attach a tension spring 127. Thus the tension spring 127 extends between the brackets 126 secured to each of the free ends of the band, and tends to hold the band in released position against the rigid portions 128 of the casing 112. The band is provided with a pair of slotted openings 129, shown in detail in Figure 9, adapted to receive the pins 130, which extend from the rigid portions 128. The pins 130 serve to centralize the brake band within the brake drum. Each of the brackets 126 is formed with an outwardly turned end 131, which abuts against the end of the brake band, forming thrust ends to which the expanding force may be applied. Thus, in Figure 8 the end 131 of the upper part of the brake band is in engagement with a curved portion 132 of the cam 122. The lower portion of the cam 122 has a similar curved portion 133, arranged to engage the cam surface of a relay cam 134 mounted to swing about a fixed pivot 135. The relay cam 134 has a curved portion 136 in engagement with the end 131 of the lower part of the band. Upon turning the lever arm 118 in the clockwise direction in Figure 8, it will be apparent that a direct tangential thrust will be imparted to the upper end 131 of the brake band by the movement of cam 122, while the lower end 131 of the brake band will have a similar tangential thrust imparted thereto by the action of the relay cam 134. The band will therefore be equally expanded in both directions. If the brake drum 115 is rotating in a clockwise direction, the entire reaction developed on the band 123 will be imparted to the relay cam 134 and thus to the brake applying cam 122, while upon rotation of the brake drum in the opposite direction the entire brake reaction will be directly subjected to the brake applying cam 122. There is therefore no tendency for the brake to become self-energizing, since the entire reaction is imparted to the brake applying cam. The operator is therefore enabled to carefully control the braking pressure developed, and the action of the power brake in applying the wheel brakes will be the same regardless of the direction of movement of the vehicle.

Figures 11, 12:
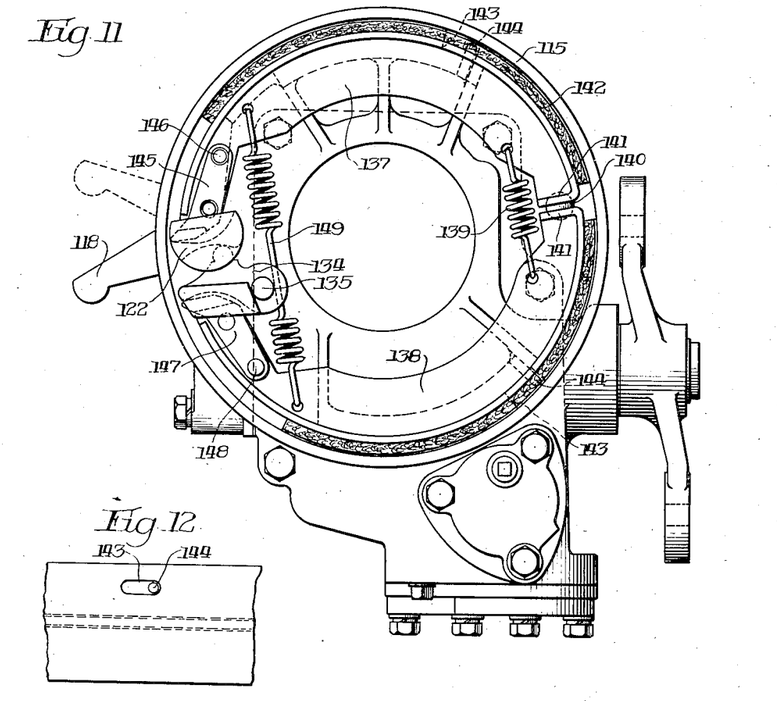
Figure 11 is a diagrammatic vertical elevation illustrating a modified arrangement of a two-shoe internal expanding brake element.
Figure 12 is a detailed elevation of the centralizer pin shown in Figure 11.
Figure 13:
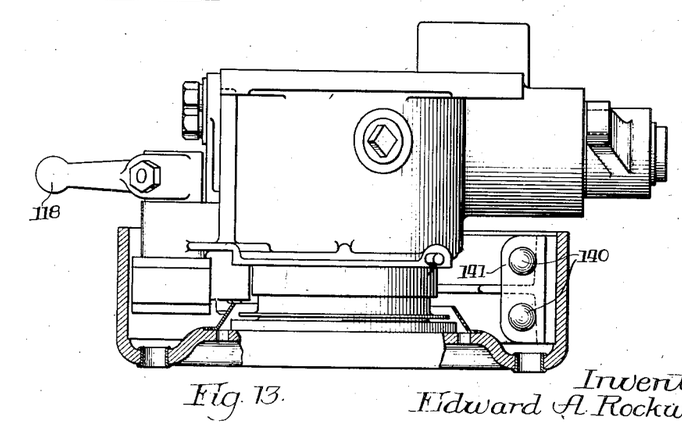
Figure 13 is a plan elevation, partially in section, of the power brake unit illustrated in Figure 11.

In Figures 11 to 13 is shown a substantially similar construction, except that rigid shoes are utilized instead of a resilient band. In these figures a two-shoe construction is illustrated, comprising an upper shoe 137 and a lower shoe 138. The brake shoes are unanchored and are not pivotally attached to each other, but their joining ends are held in thrust engagement by the spring 139. Instead of having the ends of the shoes in direct engagement, an articulated connection is provided by ball bearings 140, which are held in recesses formed in the inturned flanges 141, which are extensions of the shoe flanges. To the outer surface of the brake shoes is attached suitable friction material 142. Slots 143 are provided in the shoe flanges as previously described, and cooperate with the pins 144 mounted in rigid portions of the casing. A brake applying cam 122 and a relay cam 134 are illustrated as before. The upper cam 122 is in thrust engagement with the bracket 145 secured by rivets 146 in the web of the shoe 137, while the relay cam 134 is in engagement with a similar end bracket 147 attached by the rivets 148. A spring 149 extends between the free ends of the shoe similar to the spring 127 which is illustrated in the band type. Clockwise movement of the lever 118 will turn the brake applying cam 122 and expand both of the brake shoes and press the friction material into contact with the inner surface of the brake drum 115. The entire reaction of the brake shoes in either direction of rotation will not be transmitted against fixed anchor points, but will be imparted to the brake applying cam 122. There is therefore no tendency for the brake to become self-energizing.

Figure 14:
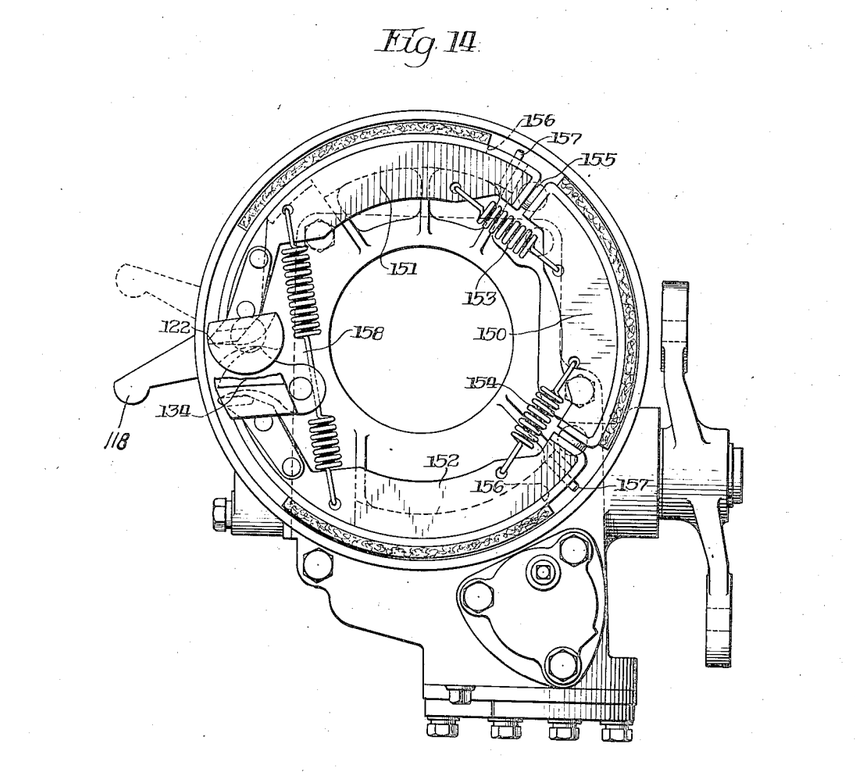
Figure 14 is a diagrammatic vertical elevation of a modified arrangement of brake shoes in which there is shown a three-shoe internal expanding construction.
Figure 15:
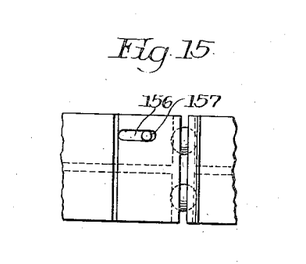
Figure 15 is a detailed elevation of the centralizer pin shown in Figure 14.

In Figures 14 and 15 a three-shoe construction is illustrated, which is otherwise substantially similar to the two-shoe construction just described. The middle shoe 150 is held in articulated relation with the end shoes 151 and 152 by the tension spings 153 and 154. Ball bearings 155 are mounted between the inturned ends of the middle shoe 150 and the adjoining ends of the end shoes 151 and 152. Slots 156 are formed in each of the end shoes 151 and 152 and engage the pins 157. A tension spring 158 extends between the free ends of the end shoes 151 and 152 and draws them into engagement with the brake applying cam 122 and the relay cam 134. The action of the three-shoe construction is substantially the same as in the two-shoe brake; that is, upon applying the brake during rotation of the brake drum in either direction, each of the shoes will be evenly applied and the entire reaction of the braking force will be subjected to the brake applying cam 122.

Figure 16:
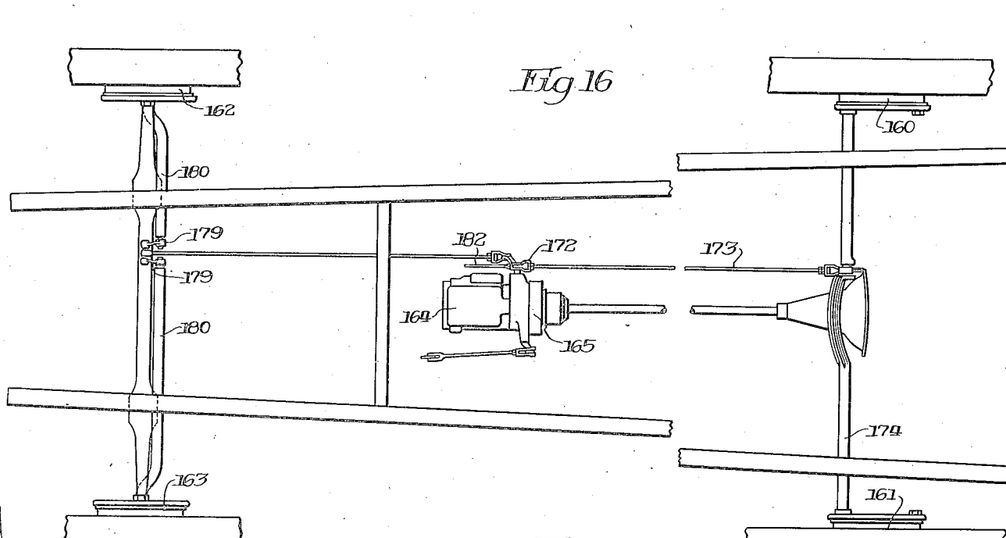
Figure 16 is a diagrammatic chassis layout illustrating the brake linkage.
Figure 17:
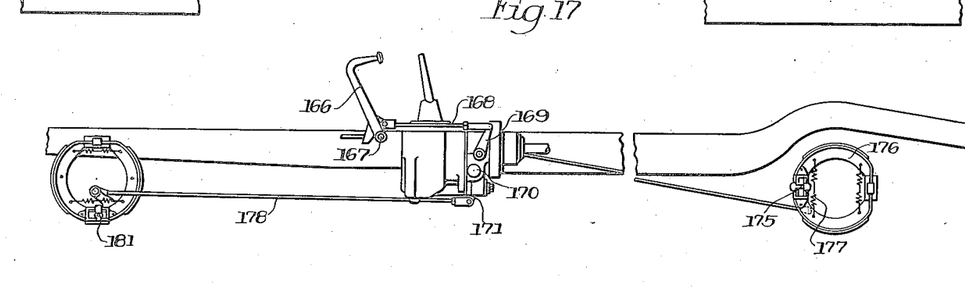
Figure 17 is a side view of Figure 16.

The manner in which the power brake is connected up with the wheel brake linkage and the selective actuating means is shown in Figures 16 and 17. A diagrammatic chassis layout is illustrated, in which 160 and 161 are the rear wheel brakes and 162 and 163 are a pair of front wheel brakes. A transmission housing is indicated at 164, and adjacent thereto is a power brake housing 165. A foot pedal lever 166 is pivoted to shaft 167 and has a linkage connection 168 to the upper end of a lever 169. The lever 169 is a brake applying lever and actuates the power unit. On the opposite side of the power unit is mounted, on the shaft 170, a brake lever 171, which has its upper arm connected by the clevis 172 to the rear brake rod 173, which transmits turning movement to the transverse brake shaft 174, having connected thereto the brake cams 175. Each of the wheel brakes may be of any customary construction and may include the brake shoes 176 connected by the pull-back springs 177. The front brake rod 178 is attached to the lower end of the brake lever 171 and transmits its movement through the levers 179 to the cross shafts 180 which are connected to the front brake cams 181. An emergency lever link connection may be attached, as indicated at 182 in Figure 16, to the upper end of the brake lever 171, whereby a direct thrust may be applied to pull on the rear brakes independently of the action of the power unit.

It will be understood that the particular construction of the pedal-controlled linkage for applying the primary power brake forms no part of the present invention and a construction which may be employed to move the input brake lever of the power brake by thrust engagement is disclosed in my application Serial No. 365,070, filed May 22, 1929.

Various modifications and changes may be resorted to without departing from the spirit of my invention as expressed in the appended claims.

I claim—

1. Brake mechanism for vehicles comprising a power shaft, a primary brake mounted upon the power shaft, secondary wheel brakes, said primary brake including a brake drum normally rotatable with said power shaft but retardable with respect thereto, means for retarding said brake drum under the control of the operator, said means comprising linkage connected to a brake applying cam, and brake elements expanded by said cam, said brake elements being movable to transmit the entire brake reaction to said brake applying cam, and means operated by the retardation of said brake drum to apply said secondary wheel brakes.

2. Brake mechanism for vehicles comprising a power shaft, a primary brake mounted upon the power shaft, secondary wheel brakes, said primary brake comprising a brake drum mounted for normal rotation during the movement of the vehicle stopped against axial movement but retardable in either direction of rotation from its normal rotative position, means for applying a braking force to said primary brake drum under the control of the operator, said means being non-energizing in either direction of rotation of said brake drum, and means actuated by the retardation of said brake drum for applying said secondary brakes.

3. Brake mechanism for vehicles comprising a power shaft, a primary brake associated with said power shaft, secondary wheel brakes, said primary brake comprising a brake drum mounted for normal rotation during the movement of the vehicle, stopped against axial movement but retardable in either direction of rotation from its normal rotative position, means for applying a braking force to said brake drum under the control of the operator, said means comprising internally expanding brake shoes mounted to react in either direction of rotation of said brake drum against the force applied by the operator, and means actuated by the retardation of said brake drum for applying said secondary wheel brakes.

4. Brake mechanism for vehicles comprising, in combination, a power shaft, a primary brake associated with said power shaft, secondary wheel brakes, said primary brake comprising a brake drum mounted for normal rotation together with said power shaft, stopped against axial movement with respect thereto but retardable in either direction of rotation from its normal rotative position, an actuating element coaxially associated with said brake drum, said actuating element being mounted for positive rotation together with said power shaft but axially displaceable relative to said brake drum, means for applying a braking force to said brake drum to retard said brake drum from its normal rotative position, said means being non-energized by the rotation of said brake drum, and means actuated by the retardation of said brake drum to displace said actuating element and apply said secondary wheel brakes.

5. Brake mechanism for vehicles comprising a power shaft, a primary brake associated with said power shaft, secondary wheel brakes, means under the control of the operator for actuating said primary brake, said means being non-energized by the rotation of said power shaft, and means operated by the actuation of said primary brake for amplifying the braking force applied thereto and applying said secondary wheel brakes by said amplified force.

6. Brake mechanism for vehicles comprising a power shaft, a primary brake associated with said power shaft, secondary wheel brakes, means for applying a braking force to said primary brake under control of the operator, said means being non-energizing during the forward movement of the vehicle but self-energizing during the rearward movement of the vehicle, means for amplifying the braking force applied to said primary brake and applying said secondary wheel brakes, said means having a higher degree of amplification during the forward movement of the vehicle than during the rearward movement of the vehicle.

7. In power brake construction, a power shaft, a retardable brake drum associated with said power shaft, an actuator collar axially displaceable relative to said brake drum mounted on said power shaft, a fixed casing enclosing said shaft and said collar, said casing comprising a central compartment and an independent dashpot housing chamber, a rock shaft supported by said casing transverse to said power shaft, one end of said rock shaft extending into said dashpot housing chamber and the other end of said rock shaft extending outside of said casing, and a brake lever attached to said outwardly extending end of said rock shaft.

8. In power brake construction, a power shaft, a rotatable brake drum associated with said power shaft, an actuator collar axially displaceable with respect to said power shaft, means for moving said actuator upon retardation of said brake drum, a rock shaft mounted transverse to said power shaft and above the same, yoke arms depending from said rock shaft in thrust engagement with said actuator, a dashpot plunger connected to one end of said rock shaft, and an output lever connected to the other end of said rock shaft.

9. In combination, wheel brakes, a power shaft, a brake drum normally rotatable with said power shaft but retardable with respect thereto, means actuated by retardation of said brake drum in either direction from its normal rotative position for applying the wheel brakes, and means including a servo brake shoe for braking said drum, said servo shoe developing an increased gripping only during rotation of said power shaft in one direction.

10. In combination, a power shaft, a primary brake mounted upon said power shaft, secondary wheel brakes, means for actuating said primary brake, means for applying said wheel brakes by the operation of said primary brake, said primary brake comprising a brake drum normally rotatable with said power shaft but retardable with respect thereto, means for applying a braking force to said brake drum, said means being self-energizing in one direction of rotation of said brake drum, and means for amplifying the force developed by the retardation of said brake drum to develop an increased force transmitted to apply the wheel brakes, said means comprising a lower amount of amplification when said brake is self-energizing.

11. Brake mechanism for vehicles comprising a power shaft, primary braking means associated with said power shaft, secondary wheel braking means, means for applying frictional retardation to said primary braking means under the control of the operator, output means for applying the secondary braking means moved by the actuation of said primary braking means, said last-named means including means for amplifying the output braking force proportionately with respect to the input retarding force and said amplifying means having a higher degree of application during the forward movement of the vehicle than during the rearward movement of the vehicle.

12. Brake mechanism for vehicles comprising a power shaft, a brake element mounted on said shaft normally rotatable therewith but retardable in either direction with respect to said shaft, means under the control of the operator for applying frictional retardation to said brake element to produce relative rotation with respect to said shaft, output linkage connected to secondary wheel brakes of the vehicle, screw means for transmitting a relative rotation of said brake element to said output brake linkage in either direction of rotation, said screw means producing a proportionately smaller travel of the output brake linkage in a forward movement of the vehicle than in the reverse movement thereof for the same degree of relative rotation.

13. A power brake construction comprising a power shaft, a brake element mounted thereon normally rotatable therewith but retardable with respect thereto in either direction of its rotation, yieldable coupling means between said shaft and said brake element comprising relatively displaceable spiral sleeves oppositely threaded together, input means for producing frictional retardation of said brake element, output means moved by the relative displacement of said spiral sleeves and the spiral threads which produce relative displacement in one direction of rotation of the power shaft having a lower pitch than the opposite spiral threads operative in the other direction of rotation.

14. Brake mechanism for vehicles comprising a power shaft, a primary brake mounted upon said power shaft, secondary wheel brakes, said primary brake including a brake element mounted for rotation with the power shaft during movement of the vehicle but retardable in either direction of rotation from its normal rotative position, means for applying a braking force to said primary brake element under the control of the operator, said means being non-energizing in either direction of rotation of said brake element and means actuated by the retardation of said brake element for applying said secondary wheel brakes.

EDWARD A. ROCKWELL.